United States Patent [19]

Hasebe et al.

[11] Patent Number: 4,723,218
[45] Date of Patent: Feb. 2, 1988

[54] NAVIGATOR FOR AUTOMOTIVE VEHICLES

[75] Inventors: Koshi Hasebe, Anjo; Kazushi Akutsu, Kariya; Kazuo Muramoto, Ichinomiya; Takashi Ono; Hajime Mikuni, both of Kariya, all of Japan

[73] Assignee: Nippondenso Co., Ltd., Kariya, Japan

[21] Appl. No.: 781,326

[22] Filed: Sep. 30, 1985

Related U.S. Application Data

[63] Continuation of Ser. No. 377,945, May 13, 1982, abandoned.

[30] Foreign Application Priority Data

May 15, 1981 [JP] Japan .................................. 56-73771
Jun. 27, 1981 [JP] Japan .................................. 56-99900

[51] Int. Cl.⁴ ...................... G06F 15/50; G09B 29/10
[52] U.S. Cl. .................................... 364/449; 364/521; 340/990; 340/995; 73/178 R
[58] Field of Search ............... 364/424, 436, 443, 460, 364/518, 521, 449; 78/178 R; 340/24, 323, 706, 709, 720, 724, 747, 748, 794, 990, 995, 996

[56] References Cited

U.S. PATENT DOCUMENTS

| | | | |
|---|---|---|---|
| 3,925,641 | 12/1975 | Kashio | 364/436 |
| 4,084,241 | 4/1978 | Tsumura | 364/450 |
| 4,138,726 | 2/1979 | Girault et al. | 364/443 |
| 4,139,889 | 2/1979 | Ingels | 364/460 |
| 4,253,150 | 2/1981 | Scovill | 364/449 |
| 4,301,506 | 11/1981 | Turco | 364/436 |
| 4,312,577 | 1/1982 | Fitzgerald | 364/424 |
| 4,360,876 | 11/1982 | Girault et al. | 364/443 |
| 4,371,935 | 2/1983 | Yamaki | 364/424 |
| 4,400,780 | 8/1983 | Nagao et al. | 364/449 |
| 4,402,050 | 8/1983 | Tagami et al. | 364/450 |
| 4,484,192 | 11/1984 | Seitz et al. | 340/995 |

*Primary Examiner*—Errol A. Krass
*Assistant Examiner*—Thomas G. Black
*Attorney, Agent, or Firm*—Cushman, Darby & Cushman

[57] ABSTRACT

In a navigator for vehicles, a distance sensor detects a distance travelled by a vehicle and a heading sensor detects a direction of travel of the vehicle. In response to the detection signals from the sensors a microcomputer computes the present position of the vehicle and generates a position signal. In accordance with the position signal from the microcomputer and the selection of display selection switches a display tube gives a graphic display of a road map or a character display of a road map data.

5 Claims, 12 Drawing Figures

NAVIGATOR FOR AUTOMOTIVE VEHICLES

This is a continuation of application Ser. No. 377,945, filed May 13, 1982, which was abandoned upon the filing thereof.

FIELD OF THE INVENTION

The present invention relates to a navigator for automotive vehicles for displaying a road map and the present position of a vehicle on a display.

BACKGROUND OF THE INVENTION

In the past, a navigator has been proposed in which a map sheet printed with a road map is attached to the front face of a CRT display and the present position of a vehicle and its travelled track are displayed on a CRT display thereby indicating to the driver the present position of the vehicle and the route followed by the vehicle on the map.

However, this navigator is inconvenient in that the driver must select a desired sheet from a large number of map sheets and manually attach the map in place.

While it will be convenient if a road map is displayed on the CRT display, since this is not the manual selection of a road sheet by the driver, there is a disadvantage that it is not easy to confirm the section represented by the road map on the CRT display and it is also difficult to change maps.

The present invention has been made to overcome the foregoing deficiencies in the prior art, and it is the primary object of the invention to provide an improved navigator for vehicles so designed that even when a road map is displayed bn a display, the driver can easily recognize what section is represented by the road map and also the selection of a map can be directed easily.

BRIEF DESCRIPTION OF THE DRAWING

The present invention will become more apparent from the following description taken in conjunction with the accompanying drawings, in which.

DETAILED DESCRIPTION OF THE INVENTION

The present invention will now be described in greater detail with reference to the illustrated embodiment.

Figure 1:
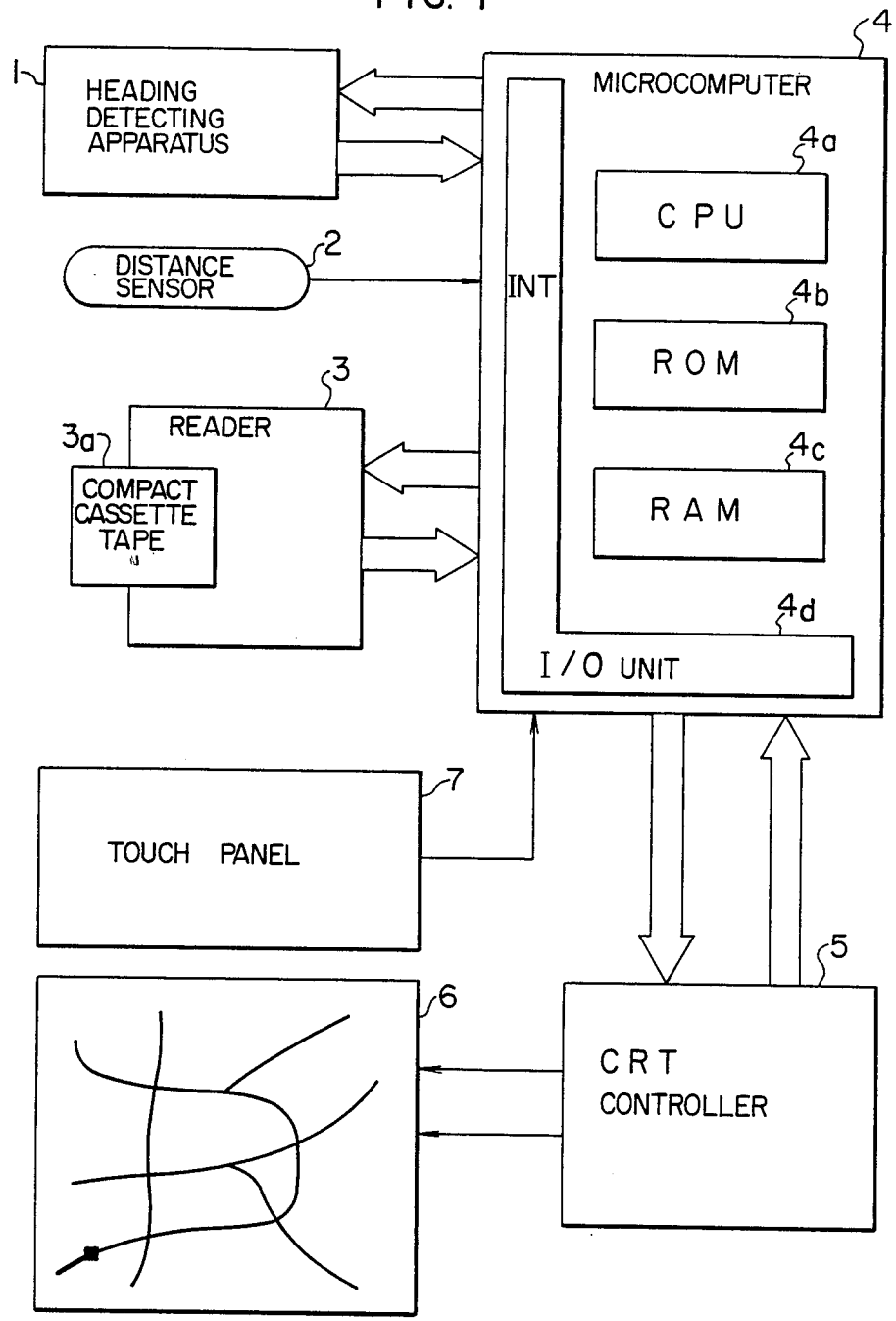
FIG. 1 is a block diagram showing the overall construction of an embodiment of the invention.

Referring to FIG. 1, numeral 1 designates a heading detecting apparatus for detecting the heading of a vehicle, comprising a heading sensor for sensing X and Y components of the earth's magnetic field corresponding to the vehicle's heading and an A/D converter for converting the signals from the heading sensor to digital signals thereby generating X-component and Y-component digital signals corresponding to the vehicle's heading. The X-component indicates a component along the direction of travelling of the vehicle. The Y-component indicates a component along the direction of travelling of the vehicle. A distance sensor 2 generates a distance pulse for every unit distance (e.g., about 39.2 cm) travelled by the vehicle. A reader 3 comprises a tape recorder whereby by setting a compact cassette. tape 3a storing the road map data of a plurality of sections (including the absolute coordinates data of the upper right points of the respective road maps), the map data of any selected one of the sections are searched and read out.

A microcomputer 4 performs software digital computational operations in accordance with a predetermined control program and it comprises a CPU 4a, an ROM 4b, an RAM 4c and an I/O unit 4d. When the microcomputer 4 comes into operation in response to a stabilized voltage supplied from a stabilized power supply circuit (not shown) adapted to generate a stabilized voltage of 5 V from the voltage supplied from the vehicle battery (not shown), the X-component and Y-component digital signals from the heading detecting apparatus 1, the distance pulse from the distance sensor 2 and the output signal from the reader 3 are received and the necessary computational operations are performed generating display signals for displaying the road map of a selected section, travel path data, etc. The RAM 4c is always backed up with the power supply from the vehicle battery irrespective of the ON and OFF of the automotive vehicle key switch.

A cathode ray tube (CRT) controller 5 is responsive to the display signals from the microcomputer 4 to separately store the road map data of the selected section, the travel path data and a character data and to generate a video signal and synchronizing signals for displaying the stored road map data and travel path data or the character data on a display. A CRT display 6 is responsive to the video signal and the synchronizing signals from the CRT controller 5 to display the road map of the selected section and the travel path or the character on the display. A touch panel switch 7 is attached onto the screen of the CRT display 6 whereby when selected one of its 12-division touch areas provided on the touch panel is operated by touching, the corresponding serial signal is generated.

Figure 2:
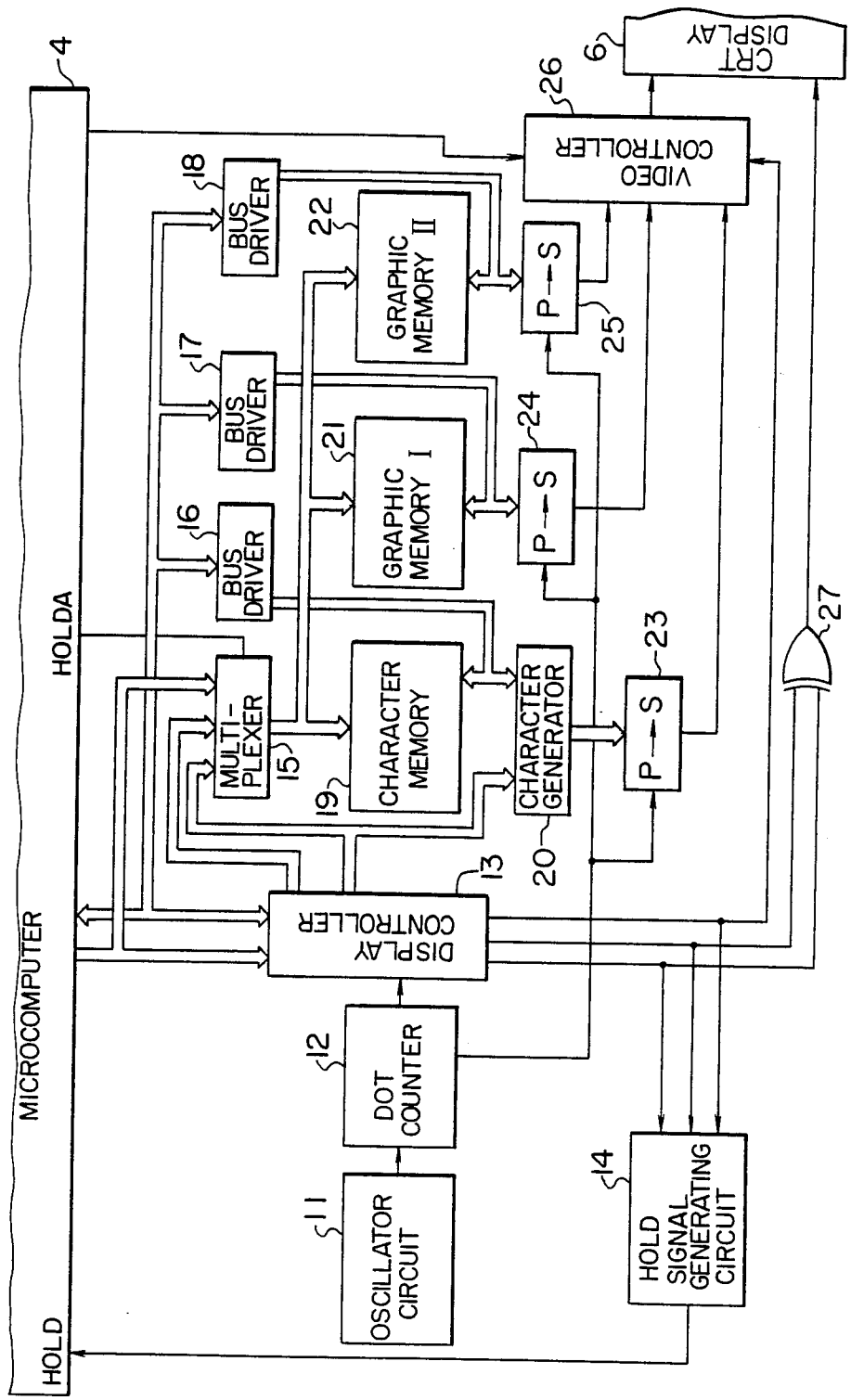
FIG. 2 is a wiring diagram showing the details of the CRT controller shown in FIG. 1.

Next, the CRT controller 5 will be described in greater detail with reference to the detailed wiring diagram snown in FIG. 2. Numeral 11 designates an oscillator circuit for generating an oscillation signal of 12.096 MHz, 12 a dot counter for dividing the frequency of the oscillation signal from the oscillator circuit 11 to generate 6.048 MHz dot timing clocks and 756 KHz character timing clocks, and 13 a display controller responsive to the command from the microcomputer 4 and the character timing clocks from the dot counter to generate horizontal and vertical synchronizing signals, display timing signals, a refresh memory address signal and a raster address signal. Numeral 14 designates a hold signal generating circuit responsive to the horizontal and vertical synchronizing signals from the display controller 13 to generate at the HOLD terminal of the microcomputer 4 a hold signal to hold the microcomputer 4 during the display period. Numeral 15 designates a multiplexer responsive to a hold acknowledge (HOLDA) signal from the microcomputer 4 to switch the address signal from the microcomputer 4 and the refresh memory address signal and the raster address signal from the display controller 13. Numerals 16, 17 and 18 designate bus drivers with 3-state outputs for changing the direction of data flow between the microcomputer 4 and display memories, and 19 a character memory for storing display data such as an ASCII code from the microcomputer 4 and also responsive to the refresh memory signal to generate its content as an address. Numeral 20 designates a character generator responsive to the display address from the character memory 19 and the raster address signal from the display controller 13 to generate a display pattern. Numeral 21 designates a first graphic memory for storing road map data from the microcomputer 4, and 22 a second graphic memory for storing a travel path data (a travel track data and a present position data) from the microcomputer 4. Numerals 23, 24 and 25 designate parallel-to-serial (P→S) converters for respectively converting the parallel signals from the character generator 20 and the first and second graphic generators 21 and 22 to serial data in response to the dot timing clocks from the dot counter 2, and 26 a video controller responsive to an image selection signal from the microcomputer 4 to switch the reception of signals between the P→S converter 23 and the P→S converters 24 and 25 and generate a video signal in response to the display timing signal from the display controller 13, thereby selecting a graphic image or a character image. Numeral 27 designates an exclusive OR circuit for generating synchronizing signals in response to the horizontal and vertical synchronizing signals from the display controller 13. The character memory 19 and the first and second graphic memories 21 and 22 are always backed up by the power supply from the vehicle battery.

More specifically, the CRT controller 5 is responsive to the data sent from the microcomputer 4 to always store the character data in the character memory 19, the road map data in the first graphic memory 21 and the travel track and present position display data in the second graphic memory 22, and the controller 5 is also responsive to the image selection signal from the microcomputer 4 such that a graphic image (for displaying the travel track and the present position on the road map) or a character image (for displaying characters or the like to designate a given road map) is selected and a video signal and synchronizing signals for displaying the selected picture on the CRT are applied to the CRT display 6.

Figure 3:
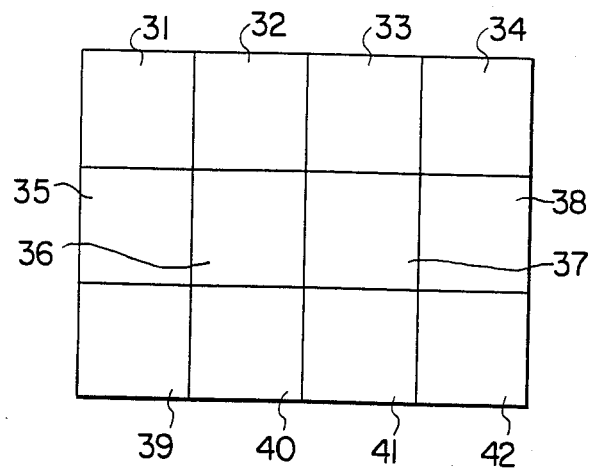
FIG. 3 is a schematic diagram showing the touch areas of a touch panel.

As shown in FIG. 3, the touch panel switch 7 is divided into 12 touch areas 31 to 42 and it comprises two sheets of glass and a transparent conductive coating applied in matrix form on each of the glass sheets. Thus, when selected one of the touch areas is depressed, the matrix transparent conductive coatings contact thereby detecting the selected touch area by the deformation of the glass sheet and a touch signal generating circuit (not shown) generates a serial signal (comprising a start signal and a touch data signal) corresponding to the detected touch area. Note that the touch signal generating circuit generates the touch data as a serial signal at intervals of 40 msec.

Figure 4:
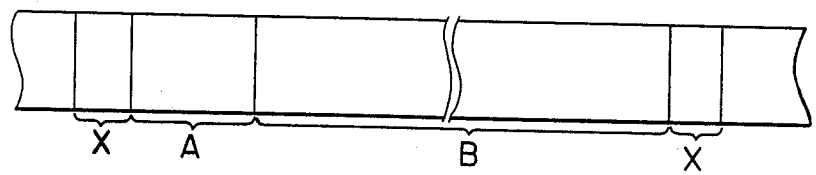
FIG. 4 is a schematic diagram showing the data area of a cassette tape.

FIG. 4 shows a data area corresponding to one of the sections on the cassette tape 3a, in which A designates a header portion storing the absolute coordinates (the coordinates with respect to the north pole) data corresponding to the upper right point of the road map for the section, B a road map data storage portion storing the map data of the section and X blank portions. As a result, by causing the reader 3 to read the portions A and B of any selected section, the map data and the absolute coordinates data of the selected section can be supplied to the microcomputer 4.

With the construction described above, the operation of the navigator according to the invention will now be described.

Figure 6:
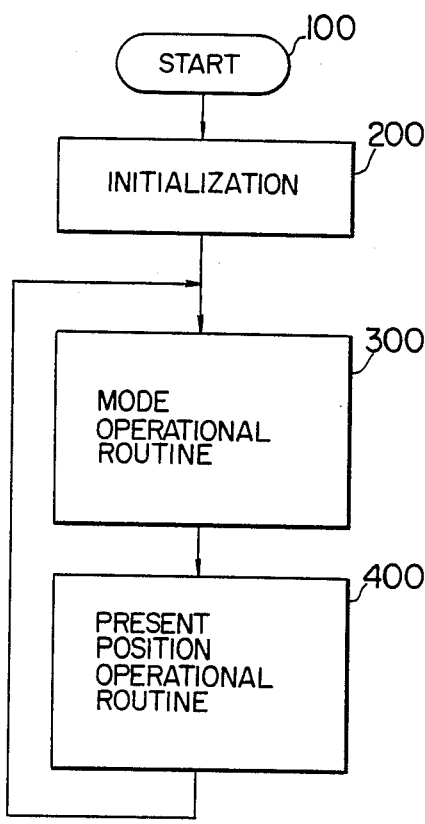
FIG. 6 is an operational flow chart showing the overall computational operations of a main routine of a microcomputer.

When the key switch of the vehicle having the component parts 1 to 7 shown in FIG. 1 is closed at the start of the operation, the respective electric units are supplied with the power from the vehicle battery and are brought into operation. Then, the microcomputer 4 is supplied with the stabilized voltage of 5 V from the stabilized power supply circuit and it comes into operation starting its processing by a start step 100 in FIG. 6. Then, the processing proceeds to an initialization routine 200 so that the registers, counters, latches, etc., in the microcomputer 4 are set to the required initial states for commencing the computational operations. This initialization step includes the operation of setting a cursor move enable flag which will be described later. After the initialization step 200, a mode operational routine 300 and a present position operational routine 400 are executed repeatedly at intervals of about several tens msec.

More specifically, the mode operational routine 300 performs operations so that either a road map mode or a character mode is selected thus displaying the contents corresponding to the selected mode on the CRT display and also the movement of a present position indicating cursor is enabled when the road map mode is selected or the designation of the road map of a given section is enabled when the character mode is selected. Then, the processing proceeds to the present position operational routine 400. The present position operational routine 400 performs operations such that the contents of the present position data and the travel track data in the second graphic memory 22 of the CRT controller 5 are modified for the X and Y components, respectively, in response to every change of travel of ±50 m. Then, the processing returns to the mode operational routine 300. Thereafter, the processing of the main routine from the mode operational routine 300 to the present position operational routine 400 are executed repeatedly at intervals of several tens msec.

Figure 7:
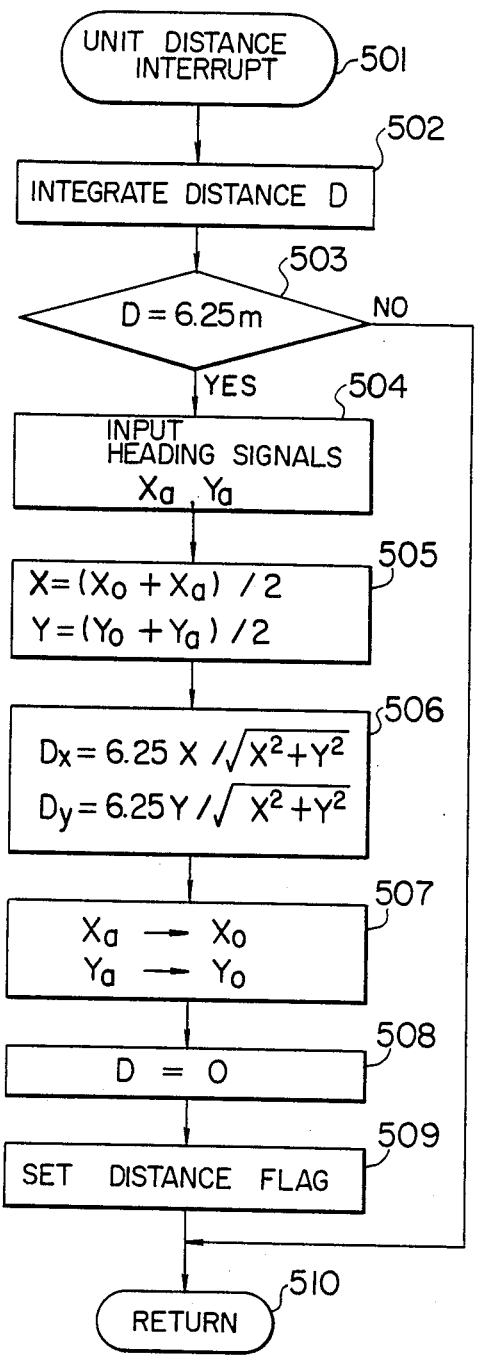
FIG. 7 is an operational flow chart showing the computational operations of an interrupt operational routine responsive to a distance pulse from a distance sensor.

With the above-described processing of the main routine being executed repeatedly, when a distance pulse is applied from the distance sensor 2 to an interrupt (INT) terminal of the microcomputer 4, the microcomputer 4 temporarily interrupts the processing of the main routine and executes the interrupt processing routine shown in FIG. 7. More specifically, an interrupt start step 501 starts the processing of this routine so that an integration step 502 integrates a unit distance data (corresponding to about 39.2 cm) and updates a distance data D stored in the RAM 4c and then the processing proceeds to a distance decision step 503 which in turn determines whether the distance data D has reached 6.25 m. If the distance data D is less than 6.25 m, the decision becomes NO and the processing proceeds to a return step 510. If the distance data D has reached 6.25 m, the decision becomes YES and the processing proceeds to a heading signal inputting step 504. The heading signal inputting step 504 inputs the digital X-component and Y-component signals Xa and Ya (the east and north are positive directions and the west and sourth are negative directions) from the heading detecting apparatus 1 and then the processing proceeds to an average heading computing step 505 which in turn obtains average heading data X and Y from the preceding heading data $X_0$ and $Y_0$ (the preceding heading data before the travelling of 6.25 m) and the current heading data Xa and Ya. Then, the processing proceeds to a distance component computing step 506 which obtains an X-direction distance component Dx as $6.25X/\sqrt{X^2+Y^2}$ and a Y-direction distance component Dy as $6.25Y/\sqrt{X^2+Y^2}$ ($X/\sqrt{X^2+Y^2}$ corresponds to cos $\theta$ and $Y/\sqrt{X^2+Y^2}$ corresponds to sin $\theta$ with respect to the angle $\theta$ measured counterclockwise from the direction of the east). Then, the processing proceeds to a storage step 507 which stores the current heading data Xa and Ya as $X_0$ and $Y_0$ for the next processing, and the processing proceeds to a distance data reset step 508 which resets the distance data D to zero. The processing then proceeds to a distance flag set step 509 which sets a distance flag and then the processing proceeds to the return step 510 thus returning to the main routine temporarily interrupted previously. In other words, the interrupt operational routine performs the operations so that the distance data D is updated by integration each time the unit distance is travelled and upon the distance data D reaching 6.25 m the corresponding X-direction and Y-direction distance components Dx and Dy are computed thereby setting the distance flag.

Next, the detailed computational operations of the mode operational routine 300 in the main routine will be described. The processing of the mode operational routine 300 is started by a touch data inputting step 301 of FIG. 8 so that the touch data from the touch panel 7 is inputted and stored in the RAM 4c. Then, the processing proceeds to a map mode decision step 302 so that it is determined whether the contents of the mode area in the RAM 4c represent the map mode. If the map mode is determined, the decision becomes YES so that the processing proceeds to a mode change decision step 303 and whether the touch data stored in the RAM 4c is one indicative of a mode change (i.e., the data resulting from the depression of the touch area 34 in FIG. 3) is determined. If the touch data is the mode change indicative data, the processing proceeds to a character mode setting step 304 which sets the contents of the mode area to a character mode and then the processing proceeds to a character selection signal outputting step 305 so that a character selection signal is applied to the video controller 26 of the CRT controller 5 to provide a character image on the CRT display 6, thus completing one cycle of the processing of the mode operational routine 300.

On the other hand, if the touch data is not the mode change indicative data, that is, if it is the data resulting from the depression of any touch area other than the touch area 34 in FIG. 3 or the data obtained when none of the touch areas is depressed (e.g., a data FF), the decision of the mode change decision step 303 becomes NO and the processing proceeds to a cursor move decision step 306. The cursor move decision step 306 determines whether the touch data is the one (or a cursor move data) resulting from the depression of any one of the touch areas 32, 33, 35, 38, 40 and 41. If the touch data is not the cursor movement data, the decision becomes NO and thus one cycle of the processing of the mode operational routine 300 is completed. If the touch data is the cursor movement data, the decision becomes YES and the processing proceeds to a cursor movement computing step 307. The cursor movement computing step 307 is responsive to the touch data so that if the touch data is one resulting from the depression of the touch area 32 or 33, the contents of the second graphic memory 22 of the CRT controller 5 are modified in a manner that the cursor indicating the vehicle's present position displayed on the CRT display 6 is moved a predetermined distance in the north direction. In like manner, the necessary operations are performed and the contents of the second graphic memory 22 are modified in such a manner that the cursor is moved the predetermined distance toward the west when the touch data is one resulting from the depression of the touch area 35, the cursor is moved similarly toward the south when the touch data is one resulting from the depression of the touch area 40 or 41 or the cursor is moved similarly toward the east when the touch data is one resulting from the depression of the touch area 38, thereby completing one cycle of the mode operational routine 300.

On the other hand, if the decision of the map mode decision step 302 is NO, the processing proceeds to a mode change decision step 308 so that whether a mode change is required is determined by the similar operation as the mode change decision step 303. If a mode change is required so that the decision becomes YES, the processing proceeds to a map mode setting step 309 and the contents of the mode area in the RAM 4c are set to the map mode. The processing then proceeds to a data modification step 310 which modifies the travel path data in the second graphic memory 22 of the CRT controller 5. In this case, the reader 3 is first controlled to search the designated section so that coordinate modification values are computed from the absolute coordinates (stored in the header portion A shown in FIG. 4) of the searched map and the preceding map absolute coordinates data and the travel track and present position data in the second graphic memory 22 are modified and corrected in accordance with the computed values. Then, the processing proceeds to a map data read step 311 so that a map data is inputted from the cassette tape 3a through the reader 3 and then the map data is outputted to the first graphic memory 21. Then, the processing proceeds to a map selection signal outputting step 312 so that a map selection signal is applied to the video controller 26 thereby causing the CRT display 6 to display a map graphic image. Thus, one cycle of the processing of the mode operational routine 300 is completed. In other words, when changing from the character image to a map graphic image which is different from the preceding one, the above-mentioned operations are performed so that the current map data is stored in the first graphic memory 21 and also the contents of the second graphic memory 22 are modified so as to modify the travel track and the present position indicative cursor to the vehicle's present position corresponding to the map. In this way, when the map displayed on the CRT display 6 is replaced with another map, the travel track and the present position can be displayed on the map portions corresponding to the replaced map.

Figure 5:
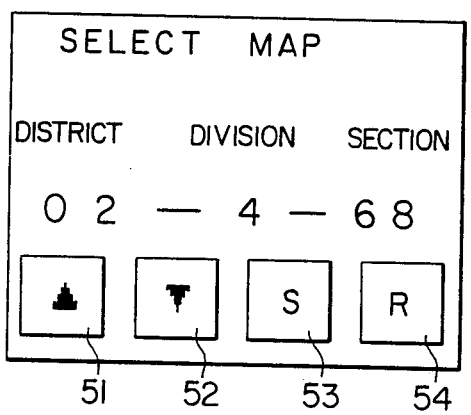
FIG. 5 is a schematic diagram showing a display on a CRT display.

On the contrary, if the decision of the mode change decision step 308 is NO, the processing proceeds to a character computing step 313. The proceeding of the processing to the character computing step 313 indicates the condition where the character mode has been set and the character selection signal has been applied to the video controller 26 and therefore the CRT display 6 is displaying a character image such as shown in FIG. 5. The FIG. 02, 4 and 68 shown in the central portion of the character image are respectively district, division and section designating figures and the character computing step 313 perform operations so that each of the figures is updated by increasing it by 1 at a time by an increment switch 51, is updated by decreasing it by 1 at a time by a decrement switch 52, is set by a set switch 53 and is reset by a reset switch 54. The data of these district, division and section figures are stored in the RAM 4c. The switches 51, 52, 53 and 54 are respectively associated with the touch areas 39, 40, 41 and 42 in FIG. 3.

Figure 8:
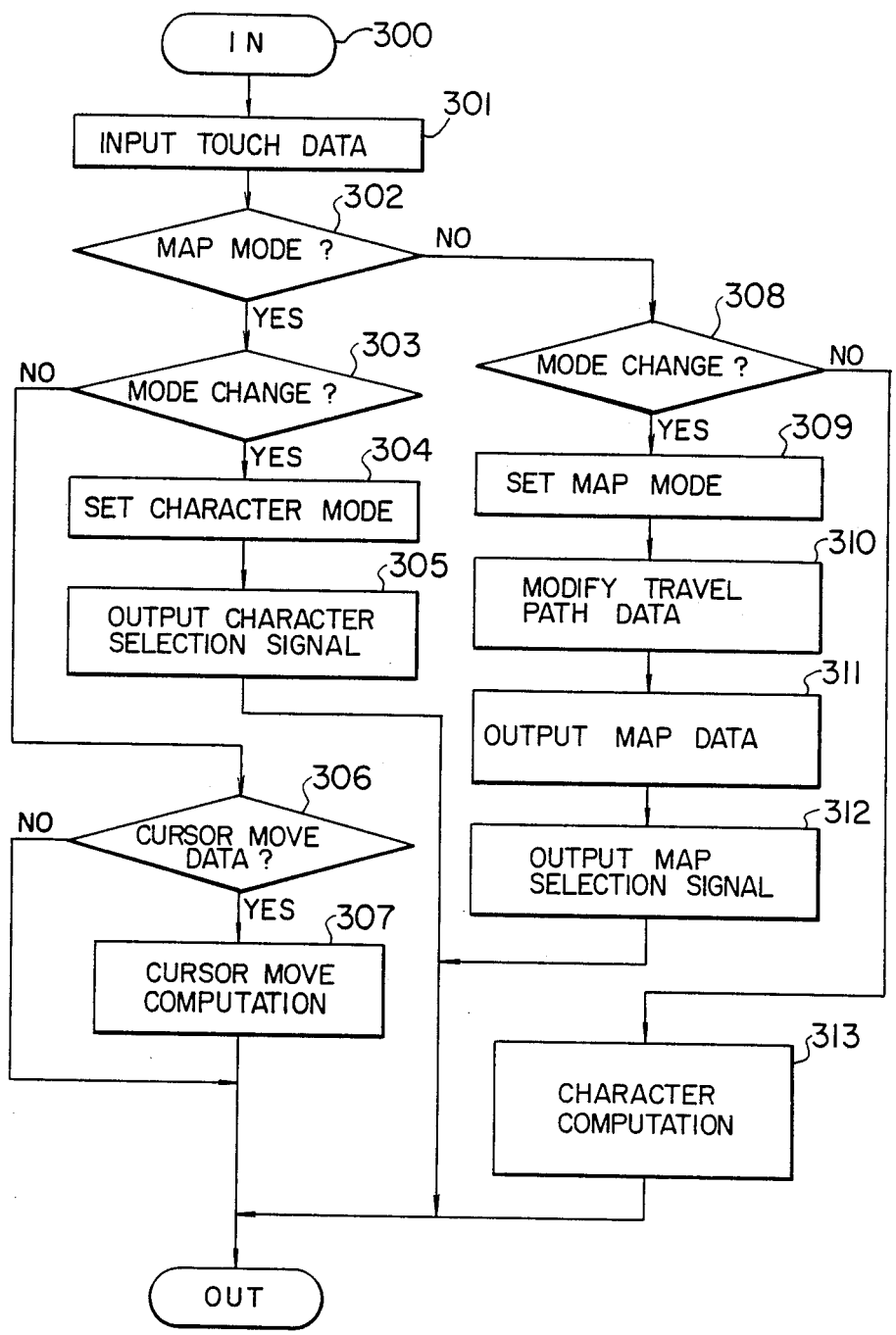
FIG. 8 is an operational flow chart showing the detailed computational operations of the mode operational routine shown in FIG. 6.

In other words, the mode operational routine 300 shown in FIG. 8 performs the following operations (1) to (4) in accordance with the touch data from the touch panel 7 and the contents of the mode area in the RAM 4c.

(1) In the map mode without a mode change command, if a cursor move command is generated, the operations for moving the cursor are performed. If there is no cursor move command, the map display is maintained as such.

(2) In the map mode, if a mode change command is generated, the map mode is changed to the character mode and also a character image is provided on the CRT display 6.

(3) In the character mode without a mode change command, any map change command to a character image such as shown in FIG. 5 is acceptable.

(4) In the character mode, if a mode change command is generated, the character mode is changed to the map mode and also a map graphic image is provided on the CRT display 6. Simultaneously, the travel track and the present position are modified and displayed.

Next, the detailed computational operations of the present position operational routine 400 of the main routine will be described. With the present position operational routine 400, its processing is started by a distance flag decision step 401 of FIG. 9 and it is determined whether the distance flag has been set by the interrupt processing routine of FIG. 7. If the distance flag has not been set, the decision becomes NO and one cycle of the processing of the present position operational routine 400 is completed. If the distance flag has been set, the decision becomes YES and the processing proceeds to an X distance correction step 402. The X distance correction step 402 corrects the X distance data DX by the X distance component Dx obtained by the interrupt processing routine as $DX=DX+Dx$, and a Y distance correction step 403 similarly performs a correction computation of $DY=DY+Dy$, and then the processing proceeds to a first X distance decision step 404 which in turn determines whether the value of the X distance data DX is greater than 50 m. In this case, if the value of the X distance data DX is greater than 50 m, the decision becomes YES so that the processing proceeds to an X distance subtraction step 405 and a value of 50 m is subtracted from the X distance data DX. Then, the processing proceeds to a display move step 406 so that the present positoin data in the second graphic memory 22 is moved in the positive direction (toward the east) by 50 m and also the travel track data is moved correspondingly.

If the decision of the X distance decision step 404 is NO, the processing proceeds to a second X distance decision step 407 which in turn determines whether the value of the X distance data DX is less than −50 m. If the value of the X distance data DX is less than −50 m, the decision becomes YES and the processing proceeds to an X distance addition step 408 thus adding the value of 50 m to the X distance data DX. Then, the processing proceeds to a display move step 409 so that the present position data in the second graphic memory 22 is moved in the negative direction (toward the west) by 50 m and also the travel track data is moved correspondingly.

Then, when the decision of the second X distance decision step 407 is NO or after the display move step 406 or 409, the processing proceeds to a Y-component display move processing routine 410 so that the similar decision and computational operations as the steps 404 through 409 are performed on the Y distance data DY computed by the Y distance correction step 403. (When the value of the Y distance data DY becomes greater than 50 m in either the positive or negative direction, the present position data and the travel track data in the second graphic memory 22 are moved by 50 m in the corresponding direction.) Then, the processing proceeds to the next distance flag reset step 411 and the distance flag is reset.

Figure 9:
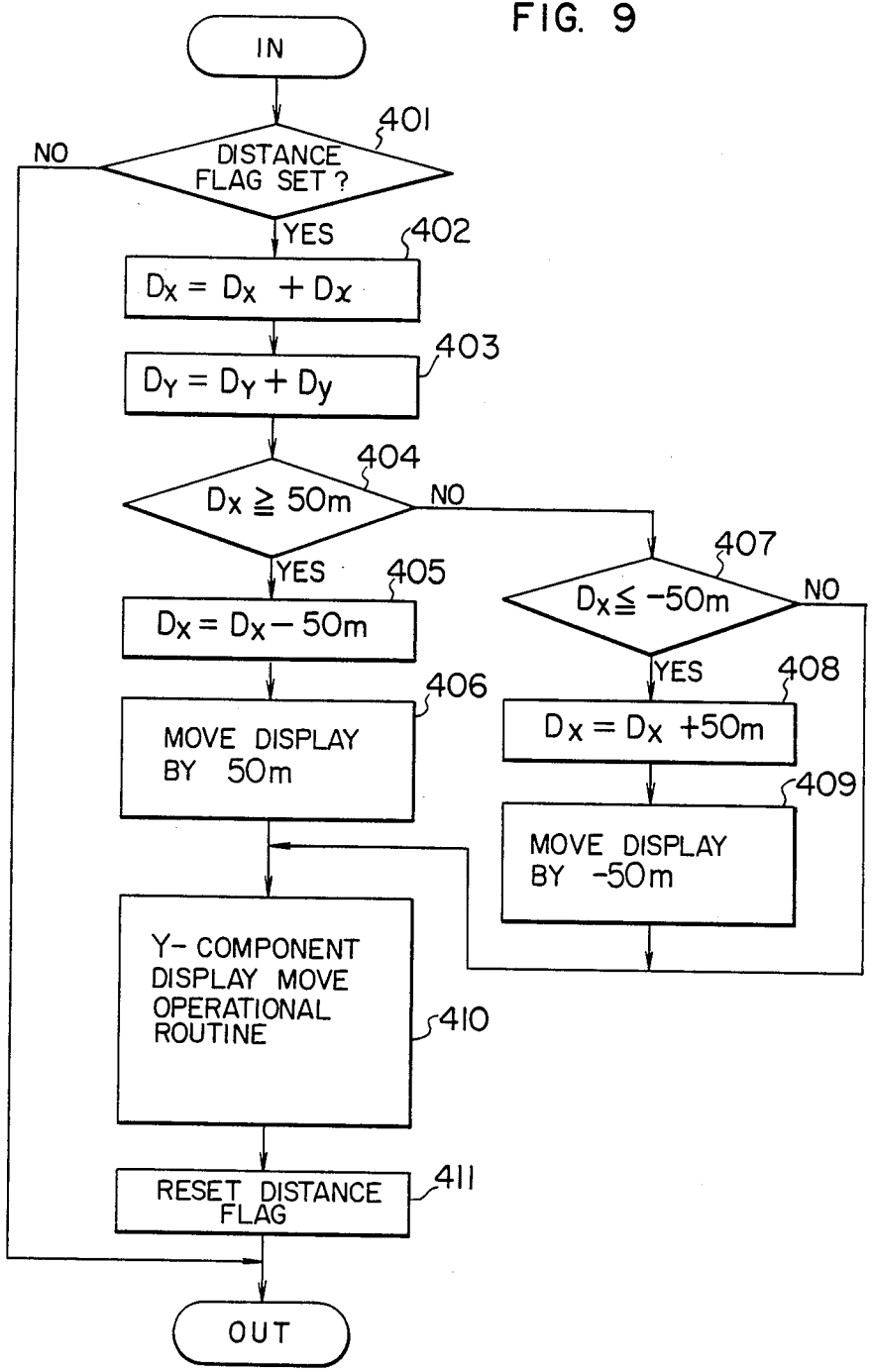
FIG. 9 is an operational flow chart showing the detailed computational operations of the present position operational routine shown in FIG. 6.

In other words, in accordance with the present position operational routine 400 shown in FIG. 9, the present position data and the travel track data in the second graphic memory 22 are modified irrespective of the image displayed on the CRT display 6.

As a result, in accordance with the repeated processing of the main routine by the mode operational routine 300 and the position operational routine 400 and the interrupt processing routine of FIG. 7, the present position data and the travel track data in the second graphic memory 22 are successively modified and also the selection of an image on the CRT display 6 is accomplished in such a manner that a map graphic image (including the display of the present position and travel track) is displayed in the map mode and the map selection character image shown in FIG. 5 is displayed in the character mode.

The present invention is not intended to be limited to the above-described embodiment. For instance, the routine of FIG. 8 may be replaced with the routine of FIG. 10 (steps 506 to 515 are added) so as to disable any manual movement of the cursor temporarily and thereby to prevent any erroneous movement of the cursor. This processing will now be described with reference to a step 303, et seq.

If the inputted touch data is not a mode change indicative data, that is, if it is the data resulting from the depression of any touch area other than the touch area 34 in FIG. 3 or the data (e.g., the data FF) resulting from the depression of none of the touch areas, the decision of the mode change decision step 303 becomes NO and the processing proceeds to a cursor move enable decision step 506. The step 506 determines whether the touch data is the one (the data resulting from the touching of the touch area 39 in FIG. 3) which enables the movement of the cursor. If the decision is YES, the processing proceeds to a 1 second lapse decision step 507 which determines whether the touch data is stored in the RAM 4c in excess of 1 second (or the touch area 39 is touched continuously more than 1 second). If the decision is NO, one cycle of the processing of this mode operational routine 300' is completed.

Figure 11:
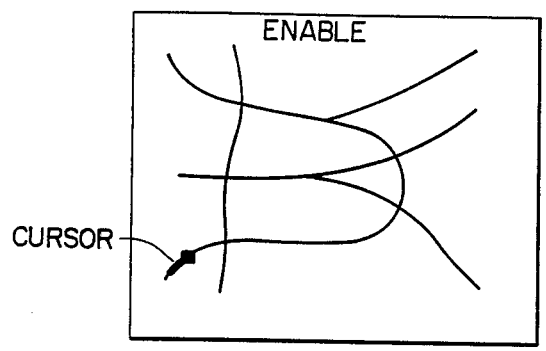
FIGS. 11 and 12 are schematic diagrams showing a CRT display according to another embodiment of the invention.

On the other hand, if the decision of the 1 second lapse decision step 507 is YES, the processing proceeds to a cursor move enable flag setting step 508 so that the cursor move enable flag in the RAM 4c is set. Then, the processing proceeds to an ENABLE display step 509 and the necessary display data for displaying the word ENABLE on the CRT display 6 as shown in FIG. 11 is stored in the second graphic memory 22, thereby completing one cycle of the processing of the mode operational routine 300'.

Figure 12:
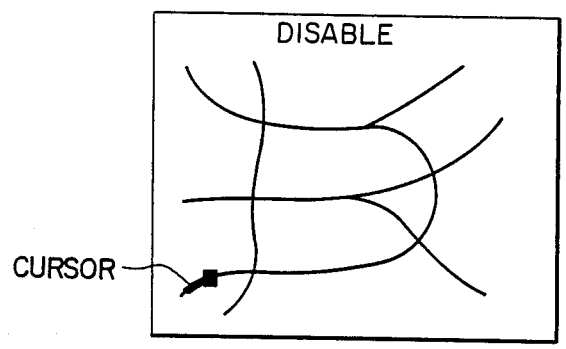

If the decision of the cursor move enable decision step 506 is NO, the processing proceeds to a cursor move disable decision step 510 which determines whether the touch data is the one (the data resulting from the touching of the touch area 42 in FIG. 3) which indicates disabling of the cursor movement. If the decision is YES, the processing proceeds to a cursor move enable flag reset step 511 and the cursor move enable flag in the RAM 4c is reset. Then, the processing proceeds to a DISABLE display step 512 and the necessary display data for displaying the word DISABLE on the CRT display 6 as shown in FIG. 12 is stored in the second graphic memory 22, thereby completing one cycle of the processing of the mode operational routine 300'.

On the other hand, if the decision of the cursor move disable decision step 510 is NO, the processing proceeds to a cursor move enable flag decision step 513. The step 513 determines whether the cursor move enable flag in the RAM 4c has been set. If the flag has not been set, one cycle of the processing of the mode operational routine 300' is completed through a DISABLE display step 514.

If the decision of the cursor move enable flag decision step 513 is YES (or the cursor move enable decision flag in the RAM 4c has been set), the processing proceeds to a cursor move decision step 306 via an ENABLE display step 515. The cursor move decision step 306 determines whether the touch data is the one (or a cursor move data) resulting from the depression of any one of the touch areas 32, 33, 35, 38, 40 and 41. If the touch data is not the cursor move data, the decision becomes NO and one cycle of the processing of the mode operational routine 300' is completed. If the touch data is the cursor move data, the decision becomes YES and thus the processing proceeds to a cursor move computing step 307. The other steps 301, 302 and 304 to 312 are the same as in the routine of FIG. 8.

Figure 10:
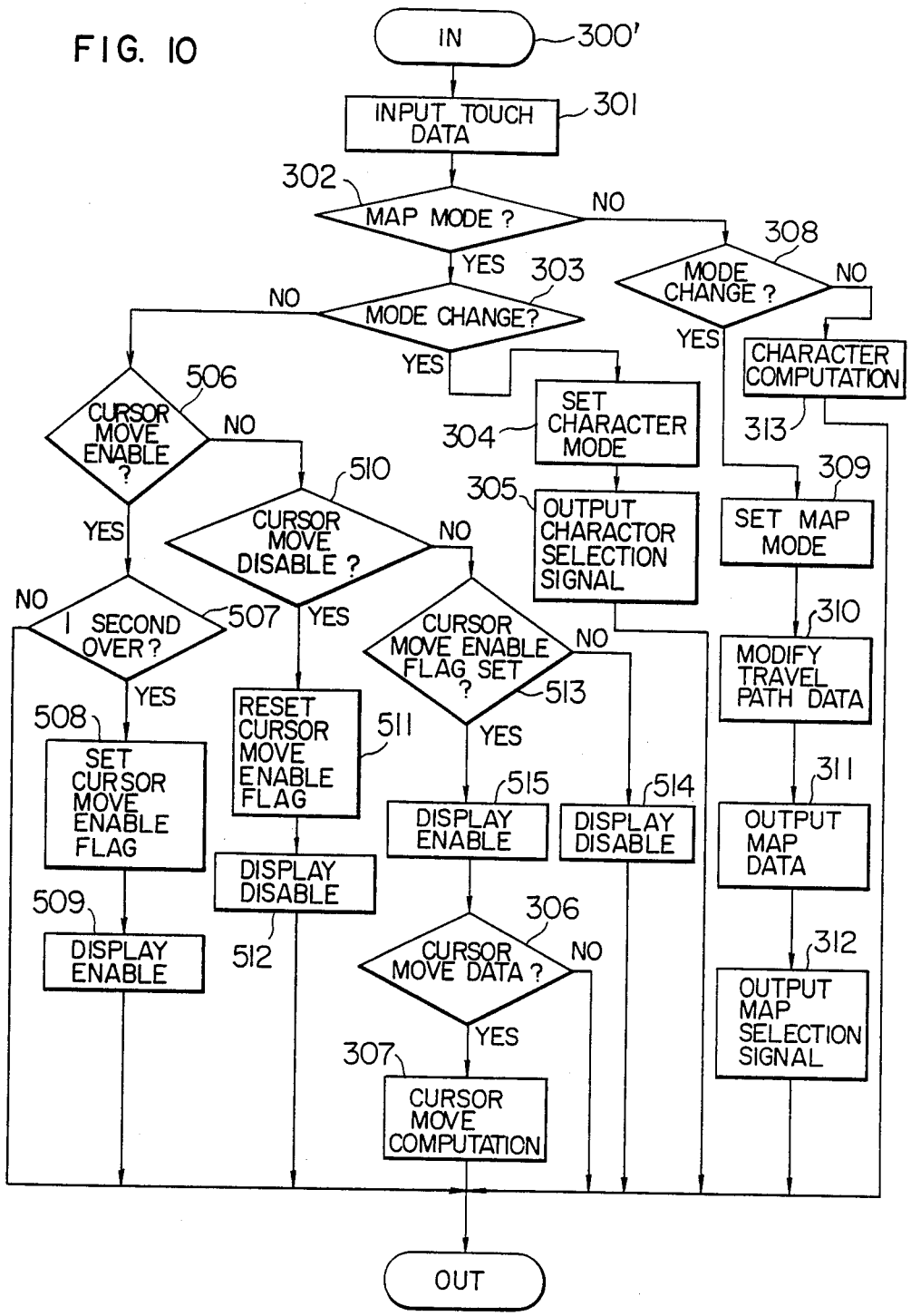
FIG. 10 is a flow chart showing another embodiment of the mode operational routine.

In other words, the mode operational routine 300' shown in FIG. 10 performs the following operations (1) and (2) in accordance with the touch data from the touch panel 7 and the contents of the mode area and the cursor move enable flag in the RAM 4c.

(1) In the map mode without a mode change command, if the touch area 39 is touched more than 1 second, the cursor move enable flag is set so that the movement of the cursor is enabled and the word ENABLE is displayed on the CRT display 6. Then, if the touch area 42 is touched, the cursor move enable flag is reset so that the movement of the cursor is disabled and the word DISABLE is displayed on the CRT display 6.

(2) In the map mode without a mode change command or when the cursor move enable flag has been set (or the CRT display 6 is displaying the word ENABLE), the necessary operations for moving the cursor are performed if a cursor move command is generated and the map display is maintained as such if no cursor move command is generated.

While, in the embodiment described above, the movement of the cursor is enabled when the touch area 39 is touched more than 1 second and the movement of the cursor is disabled when the touch area 42 is touched, it is possible to arrange the touch panel 7 so that each time any given one of the touch areas is depressed, the cursor move enable condition is changed to the cursor move disable condition or vice versa. Further, the switch means for effecting the transition between the cursor move enable state and the cursor move disable state may be provided in the form of external switch means instead of being incorporated in the touch panel 7.

Still further, the words ENABLE and DISABLE may be replaced by other words and also they may be displayed at any place other than the CRT display 6 by for example turning on and off LEDs.

Still further, while the movement of the cursor is disabled through the touch operation of the touch panel 7, this may be effected by means of a voice command.

Still further, while the CRT display 6 is used as display means, a liquid crystal display, EL display or the like may also be used.

We claim:

1. A navigator for a vehicle for displaying a present position of the vehicle on a displayed road map, comprising:

display means having a screen for electronically and selectively displaying either the road map including the present position of the vehicle or running region designation data so as to designate a specific running region of the vehicle on the screen;

display mode selecting means for selecting one of a map mode, which allows said display means to display the road map, and of a running region designation mode, which allows said display means to display the running region designation data;

running region designation means for manually designating, when said display mode selecting means selects said running region designation mode, the specific running region of the vehicle on a basis of said running region designation data displayed on said screen;

memory means for storing map data indicative of a plurality of running regions stored therein;

read means for reading the map data of the running region designated by said running region designation means from said memory means;

present position detection means for calculating the present position of the vehicle based on signals from a heading detecting apparatus and a distance sensor;

first display control means for allowing, when said map mode is selected after the designation of the specific running region by said running region designating means, said display means to display the road map of the specific running region in accordance with the map data read by said read means; and second display control means for allowing, when said map mode is selected, said display means to display the present position of the vehicle calculated by said present position detection means on the road map displayed by said display means.

2. A navigator for a vehicle according to claim 1, wherein said display mode selecting means includes panel switch means provided on the screen of said display means.

3. A navigator for a vehicle according to claim 1, wherein said running region designation means includes map select switch means to be formed on the screen of said display means when said display mode selecting means selects said running region designation mode.

4. A navigator for a vehicle according to claim 1, further comprising present position moving means for allowing an operator to move the present position of said vehicle displayed on the screen.

5. A navigator for a vehicle according to claim 4, wherein said present position moving means is provided on the screen of said display means.

* * * * *